US009256998B2

(12) United States Patent
Ito

(10) Patent No.: US 9,256,998 B2
(45) Date of Patent: Feb. 9, 2016

(54) BANKNOTE HANDLING MACHINE

(75) Inventor: Osamu Ito, Kawaguchi (JP)

(73) Assignee: GLORY LTD., Himeji-Shi, Hyogo-Ken (JP)

( * ) Notice: Subject to any disclaimer, the term of this patent is extended or adjusted under 35 U.S.C. 154(b) by 351 days.

(21) Appl. No.: 12/924,525

(22) Filed: Sep. 28, 2010

(65) Prior Publication Data

US 2011/0077770 A1 Mar. 31, 2011

(30) Foreign Application Priority Data

Sep. 28, 2009 (JP) ................................ 2009-222273

(51) Int. Cl.
*G06Q 40/00* (2012.01)
*G07D 11/00* (2006.01)

(52) U.S. Cl.
CPC ................................ *G07D 11/0084* (2013.01)

(58) Field of Classification Search
USPC .......................................... 235/379; 700/218
See application file for complete search history.

(56) References Cited

U.S. PATENT DOCUMENTS 4,825,378 A * 4/1989 Yuge ............................ 700/223
2006/0076212 A1* 4/2006 Kuroda et al. ................ 194/206

FOREIGN PATENT DOCUMENTS

| | | | | |
|---|---|---|---|---|
| EP | 1 833 029 A1 | 9/2007 | | |
| EP | 1833029 A1 * | 9/2007 | ............ G07D 11/00 |
| JP | 2000-099794 | 4/2000 | |
| WO | WO 03/107282 A2 | 12/2003 | |
| WO | WO 2008/090595 A1 | 7/2008 | |
| WO | WO 2009/090758 A1 | 7/2009 | |

OTHER PUBLICATIONS

European Search Report (Application No. 10181291.5-1229 / 2306410) (6 pages-dated Sep. 20, 2011).
Office Action of Chinese Patent Application No. 201010297950.7 (with English Translation) (8 pages-dated Oct. 19, 2011).
Japanese Office Action with English Translation (Application No. 2009-222273) (4 pages-dated Nov. 26, 2013).

* cited by examiner

*Primary Examiner* — Rafferty Kelly
(74) *Attorney, Agent, or Firm* — Renner, Kenner, Greive, Bobak, Taylor & Weber

(57) ABSTRACT

A banknote handling machine according to the present invention efficiently utilizes stacking units so as to efficiently process banknotes by returning odd banknotes of a first predetermined type in every transaction whereas keeping odd banknotes of a second predetermined type in a stacking unit, and performing subsequent transaction when banknote processing including depositing, taking-in, recognizing, sorting/stacking, and bundling of banknotes and confirming the deposit amount for one transaction is sequentially performed for a plurality of transactions.

5 Claims, 4 Drawing Sheets

BANKNOTE HANDLING MACHINE

CROSS REFERENCE TO RELATED APPLICATION

This application is based upon and claims benefit of priority from the Japanese Patent Application No. 2009-222273, filed on Sep. 28, 2009, the entire contents of which are incorporated herein by reference.

FIELD OF THE INVENTION

The present invention relates to a banknote handling machine and, more particularly, to a banknote handling machine for recognizing/counting banknotes, sorting them by type, and, then, bundling them per predetermined number of banknotes.

BACKGROUND OF THE INVENTION

A banknote handling machine for arranging collected banknotes by bundling per predetermined number is used in a financial institution such as a bank. In such a banknote handling machine, when, for example, banknotes of a plurality of denominations including fit/unfit notes are deposited, the banknotes are taken in one by one and recognized to be sorted by denomination and fitness and then, are stacked in corresponding stacking units. When the number of banknotes stacked in the stacking unit reaches a predetermined number (for example, 100), this batch of banknotes is transported to bundling means by a batch transport unit, then is bundled with a bundling material such as a paper tape to be finally dispensed. Odd banknotes, whose number does not reach the predetermined number, stacked in the stacking unit may be transported to an odd banknote return port to be returned (see, for example, Japanese Patent Application Laid-Open No. 2006-107029).

When bundling banknotes per 100 sheets while confirming deposit amount per transaction is performed continuously for a plurality of transactions, by using the above-described conventional banknote handling machine, a process for the subsequent transaction is performed with odd banknotes left in the banknote handling machine, or such odd banknotes are all returned each time a transaction is ended. Here, the banknote processing in one transaction includes, for example, depositing, taking-in, recognizing, sorting, stacking, bundling and confirming the deposit amount with respect to the banknotes of the plurality of denominations including fit/unfit notes, as described above.

In the case where all of the odd banknotes are left, the types of the banknotes having the smaller number to be processed could keep occupying the stacking units, thereby making it impossible to efficiently use the stacking units. Moreover, in the case where all of the odd banknotes are returned each time banknote processing for one transaction is ended, a predetermined type of banknotes contained in a plurality of transactions cannot be efficiently bundled.

As described above, the conventional banknote handling machine has had a problem that a series of banknote processing cannot be efficiently performed.

SUMMARY OF THE INVENTION

An object of the present invention is to provide a banknote handling machine capable of efficiently performing a series of banknote processing.

In general, according to one embodiment, a banknote handling machine includes a receiving unit, through which deposited banknotes are taken in one by one, a recognition unit which recognizes and counts the banknotes taken in through the receiving unit, a plurality of stacking units which stack thereon the banknotes recognized by the recognition unit per denomination, a first transport unit which transports the banknotes from the receiving unit to the stacking unit, a bundling unit which bundles a predetermined number of banknotes, an odd banknote returning unit which returns odd banknotes which do not reach the predetermined number, a second transport unit which transports the banknotes reaching the predetermined number out of the banknotes stacked on the stacking units in the stacked state to the bundling unit whereas transports the odd banknotes to the odd banknote returning unit, and a control unit which controls in such a manner as to transport the odd banknotes of a first predetermined type from the stacking unit to the odd banknote returning unit whereas to keep the odd banknotes of a second predetermined type remaining on the stacking unit.

According to the present invention, a series of banknote processing can be efficiently performed.

DETAILED DESCRIPTION OF THE EMBODIMENTS

Hereafter, embodiments according to the present invention will be described with reference to the drawings.

First Embodiment

Figure 1:
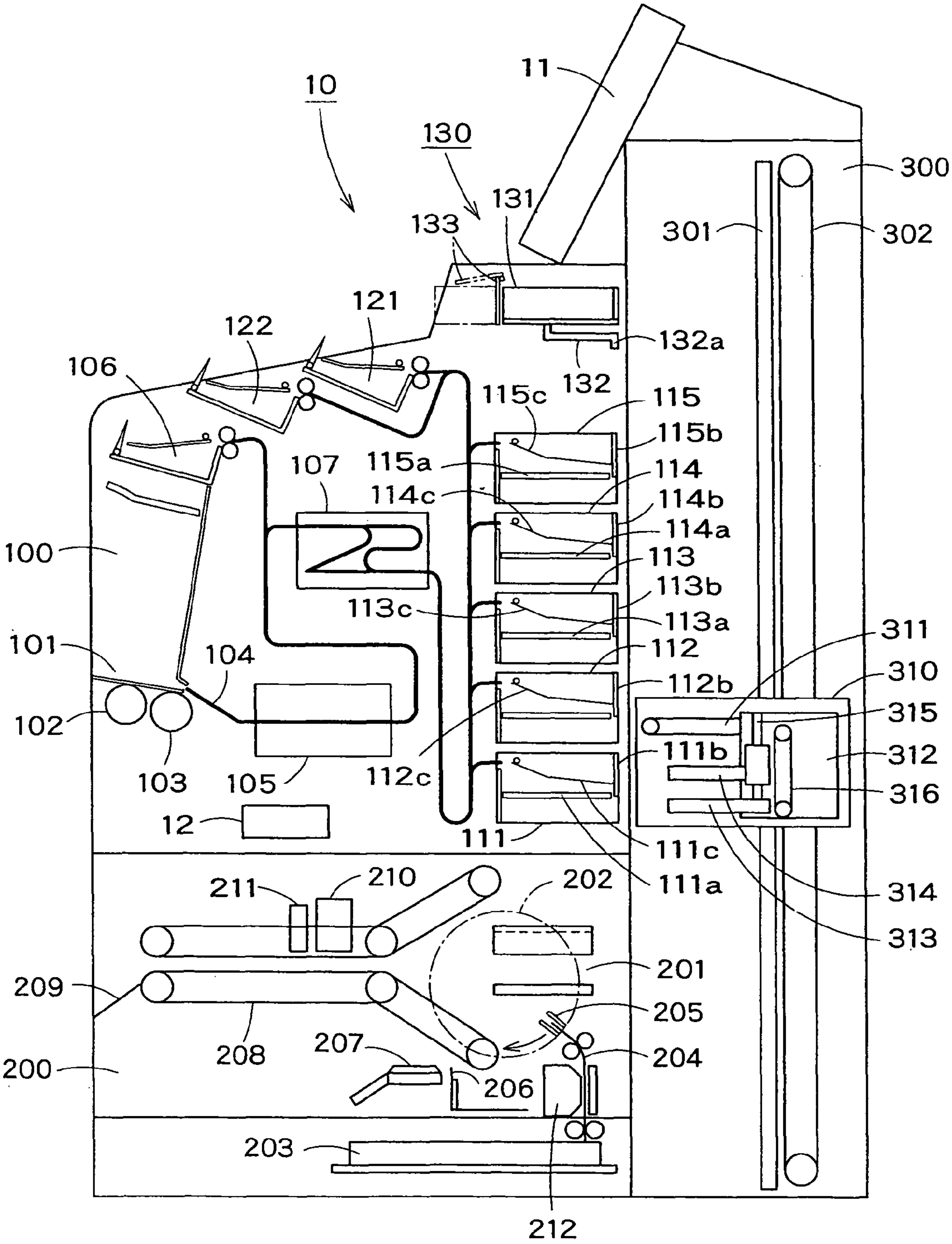
FIG. 1 is a vertically cross-sectional view showing a banknote handling machine in a first embodiment according to the present invention.

FIG. 1 is a vertically cross-sectional view schematically showing the inside configuration of a banknote handling machine in a first embodiment according to the present invention. A banknote handling machine 10 includes an operation/display unit at an uppermost section thereof, and mainly includes a sorting/stacking unit 100 at an upper front section thereof, a banknote bundling unit 200 at a lower front section thereof, and a transport unit 300 at a back section thereof. The banknote handling machine 10 further includes a control unit 12 for controlling the sorting/stacking unit 100, the banknote bundling unit 200, and the transport unit 300.

First, a description will be given of the sorting/stacking unit 100. A receiving unit 101 which receives a banknote to be processed is disposed substantially at the center in front of the sorting/stacking unit 100. Mixed denomination banknotes deposited into the receiving unit 101 are fed by feed rollers 102 and 103, and then, are transported to a transport unit 104.

The transport unit 104 includes a recognition unit 105 for recognizing denomination, fitness, face/back, and authentication. Moreover, the recognition unit 105 counts the number of banknotes by type, and the count result is displayed on the operation/display unit 11. The transport unit 104 is diverted after passing through the recognition unit 105. Banknotes which cannot be recognized, or counterfeit banknotes, are stacked as reject banknotes in a reject unit 106 according to the recognition result obtained by the recognition unit 105.

The fit and genuine banknotes are reversed in a face/back reversing unit 107 according to the face/back judgment result obtained by the recognition unit 105 such that the face/back of all of the banknotes match with each other. Furthermore, the banknotes are stacked in any one of stacking units 111 to 115 for stacking the banknotes to be bundled, based on the denomination or the like judged by the recognition unit 105.

The stacking units 111 to 115 have stacking stages 111*a* to 115*a*, respectively, which can be lifted by drive means, not shown.

FIG. 1 shows the state in which each of the stacking units 111 to 115 can stack the banknotes therein. Specifically, the stages 111*a* to 115*a* are located at lower ends of wall members 111*b* to 115*b*, each of which is disposed at about ⅔ of an upper portion. Therefore, the transported banknotes hit the wall members 111*b* to 115*b* and stop, and then, are stacked on the stages 111*a* to 115*a*. At this time, in order to prevent banknotes from falling out and to enable stable stacking, there are provided pressers 111*c* to 115*c* which are turnable according to the stacked amount.

Here, the stages 111*a* to 115*a* and the wall members 111*b* to 115*b* have cutouts, through which hands 313 and 314 disposed in the transport unit 300, as described below, freely pass.

The banknotes which are not to be stacked are transported by the transport unit 104, and then, are stacked in external stacking units 121 and 122.

A variety of objects to be stacked in the stacking units 111 to 115 and the external stacking units 121 and 122 can be set, thereby providing various kinds of processing. For example, the combination of denomination, fitness, and old/new version can be set. The processing can be set via the operation/display unit 11.

Under the operation/display unit 11 is disposed an odd banknote returning unit 130 capable of returning odd banknotes whose number does not reach the number for bundling, out of the banknotes stacked on the stacking units 111 to 115. The odd banknotes are transported to a return tray 131 in the odd banknote returning unit 130 by the transport unit 300 described below. A tip 132*a* of a lever member 132 disposed at the lower surface of the return tray 131 is pressed from the back thereof, so that the return tray 131 advances. Thereafter, a shutter 133 disposed at the front is opened, so that the return tray 131 advances up to a position indicated by dashed lines, whereby the odd banknotes placed on the return tray 131 can be removed.

It may be previously set which denomination of the odd banknotes stacked in the stacking units 111 to 115 are returned from the odd banknote returning unit 130, or an instruction may be input through the operation/display unit (i.e., an instruction receiving unit) 11. A method for returning the odd banknotes will be described later.

Next, description will be made on the banknote bundling unit 200. In the banknote bundling unit 200, bundling is carried out by winding around the stacked banknotes with a paper tape.

When the number of banknotes stacked in any one of the stacking units 111 to 115 reaches a predetermined number, the banknotes are transported by the transport unit 300, described below, to a setting unit 201 in the banknote bundling unit 200, and held therein.

A rotating mechanism 202 is provided for winding predetermined portions of the held banknotes with a bundling tape. Thereafter, the tip of a bundling tape 204 taken from a bundling tape stacking unit 203 is stopped by a tape stopper 205. Then, the banknotes can be bundled by rotating the tape stopper 205.

There are further provided a cutter 206 for cutting the tip of the tape after bundling and a heater 207 for thermally bonding the tip portion.

The bundled banknotes are dispensed to a bundled banknote dispensing outlet 209 via a belt-type transport mechanism 208. Here, there are provided on the way of the transportation a bank name stamp 210 for stamping on the bundle the name of a financial institution which performs the processing, and an unfit banknote stamp 211 for stamping on the bundle to indicate the banknotes are unfit banknotes. At a feeding-out unit of the bundling tape 204 is provided with a printer 212 for printing a processing date, a processing time, a machine serial number, processing information featuring the present embodiment, a person-in-charge number, and the like.

Next, a description will be given of the transport unit 300. The transport unit 300 includes a guide shaft 301 vertically installed, an elevating unit 310 capable of vertically moving while engaging with the guide shaft 301, and a drive belt 302 for elevating the elevating unit 310.

The elevating unit 310 includes a block 312 capable of advancing and retreating via a belt mechanism 311. The block 312 has the lower fixed hand 313 and the upper hand 314 which is vertically moved along a shaft 315 by a belt 316. The hands 313 and 314 take out the banknotes stacked on the stacking units 111 to 115 by holding it therebetween, and then, the taken-out banknotes are transported to the banknote bundling unit 200 or the odd banknote returning unit 130.

The control unit 12 controls the transport unit 104 and the transport unit 300 according to the recognition/count result obtained by the recognition unit 105, the number of banknotes stacked on the stacking units 111 to 115, the return setting of the odd banknotes, or the like.

A description will be given below of one example of operation for performing banknote processing for one transaction using the above-described banknote handling machine 10. Here, the banknote processing in one transaction is referred to depositing, taking in, recognizing, sorting/stacking, and bundling the banknotes and confirming the deposit amount. Banknotes to be deposited are banknotes of, for example, a plurality of denominations and including fit/unfit notes.

The banknotes taken in through the receiving unit 101 are recognized by the recognition unit 105. Reject banknotes are transported to the reject unit 106. Out of the banknotes other than the reject banknotes, the banknotes which are not to be bundled are transported to the external stacking unit 121 or 122 by the transport unit 104, while the banknotes which are to be bundled are transported to any one of the stacking units 111 to 115 by the transport unit 104 according to the type such as the denomination. Here, at least one of the stacking units 111 to 115 is set as an open stacking unit, to which no banknote is transported.

When the number of banknotes stacked in any one of the stacking units 111 to 115 reaches a predetermined number (e.g., 100), the batch of the predetermined number of banknotes is transported to the banknote bundling unit 200 by the transport unit 300, to be bundled.

For example, it is assumed that the number of banknotes stacked in the stacking unit 111 reaches the predetermined number, and the stacking unit 115 is set as an open stacking unit. While the batch of banknotes is taken out from the stacking unit 111 by the transport unit 300, no banknote can be further stacked in the stacking unit 111. Therefore, the banknotes of the denomination that have been set to be stacked in the stacking unit 111 are stacked in the stacking unit 115. When the batch of banknotes has been taken out of the stacking unit 111 by the transport unit 300, the stacking unit 111 is set as an open stacking unit in turn.

When all of the banknotes deposited through the receiving unit 101 are taken in, the deposit amount of one transaction is confirmed and the banknote processing is completed. In the case where the banknotes whose number do not reach the predetermined number (i.e., the odd banknotes) remain in the stacking units 111 to 115, the odd banknotes are taken out and transported from each of the stacking units 111 to 115 to the odd banknote returning unit 130 by the transport unit 300, so that the odd banknotes can be removed.

In the present embodiment, it is possible to set the denomination of the odd banknotes to be left in the stacking units 111 to 115 and the denomination of the odd banknotes to be returned through the odd banknote returning unit 130. Therefore, only the odd banknotes whose denominations are set to be returned are transported to the odd banknote returning unit 130 by the transport unit 300.

The odd banknotes whose denominations are not to be returned are kept in the stacking units 111 to 115, and then, the banknote processing is sequentially performed for a next transaction.

Now, description will be made on transitions in stacked numbers in each of the stacking units in the case of sequential banknote processing for a plurality of transactions and respective display screens of the operation/display unit 11. Here, it is assumed that banknotes including seven denominations of 1$, 2$, 5$, 10$, 20$, 50$, and 100$ are processed such that 2$ banknotes are transported to the reject unit 106; 5$ banknotes are transported to the external stacking unit 122; 10$ banknotes are transported to the external stacking unit 121; and 1$, 20$, 50$, and 100$ banknotes are transported to any of the stacking units 111 to 115.

Setting of the banknotes to be returned is performed every time the banknote processing for each transaction is ended. Moreover, the number of banknotes to be bundled is 100.

As shown in Table 1 below, fifty 1$ banknotes, one 2$ banknote, twenty 5$ banknotes, ten 10$ banknotes, sixty 20$ banknotes, fifteen 50$ banknotes, and ten 100$ banknotes are deposited in a first transaction. The banknotes are transported to and stacked in the stacking units 111 to 114, the external stacking units 121 and 122, and the reject unit 106, respectively, based on the recognition result by the recognition unit 105. The stacking unit 115 is set as the open stacking unit.

TABLE 1

| | First transaction | | | |
|---|---|---|---|---|
| Denomination | Number of banknotes to be deposited | Transport destination | Number of stacked banknotes before deposit | Number of stacked banknotes after deposit |
| $1 | 50 | Stacking unit 111 | 0 | 50 |
| $2 | 1 | Reject unit 106 | 0 | 1 |
| $5 | 20 | External stacking unit 122 | 0 | 20 |
| $10 | 10 | External stacking unit 121 | 0 | 10 |
| $20 | 60 | Stacking unit 112 | 0 | 60 |
| $50 | 15 | Stacking unit 113 | 0 | 15 |
| $100 | 10 | Stacking unit 114 | 0 | 10 |

Although not shown, the number, amount, total number, and total amount of banknotes by denomination in the first transaction are displayed on the operation/display unit 11. An operator checks the displayed recognition result, and then, presses a deposit confirmation button to confirm the deposit.

Figure 2:
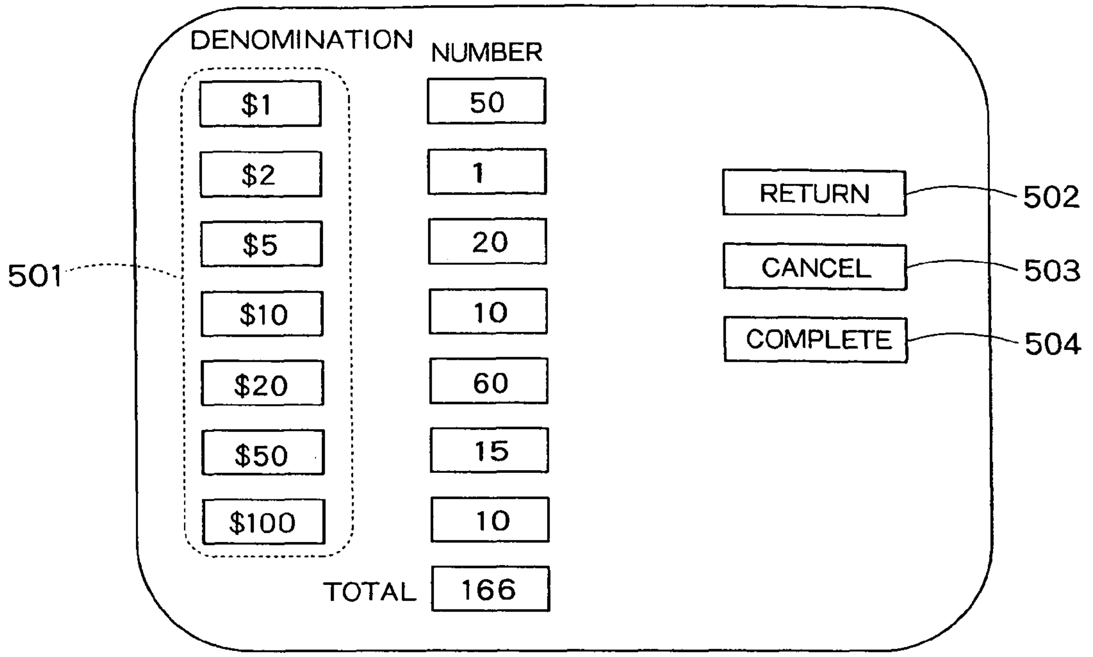
FIG. 2 is a diagram showing one example of a display screen for setting the return of an odd banknote.

After the deposit confirmation, the numbers of stacked banknotes contained inside of the banknote handling machine 10 are displayed on the operation/display unit 11 by denomination, as shown in FIG. 2, and the return of the odd banknotes can be set. The denomination to be returned can be designated by pressing a denomination key 501. The designated odd banknotes are returned by pressing a return key 502 after pressing the denomination key 501.

Specifically, the control unit 12 controls the transport unit 300 to take out the odd banknotes of the denomination corresponding to the pressed denomination key 501 so as to transport them to the odd banknote returning unit 130.

The designation of the denomination of the banknotes to be returned can be cancelled by pressing a cancellation key 503 after pressing the denomination key 501. Moreover, the acceptance of the return setting is completed by pressing a completion key 504, and then, the banknote handling machine 10 stands by for deposit processing for a next transaction.

In the example shown in FIG. 2, without returning the odd banknotes after the completion of the deposit processing for the first transaction, the next deposit processing is performed for a subsequent second transaction.

As shown in Table 2, thirty 1$ banknotes, five 5$ banknotes, ten 10$ banknotes, fifty 20$ banknotes, five 50$ banknotes, and twenty 100$ banknotes are deposited in the second transaction subsequent to the first transaction.

TABLE 2

| | Second transaction | | | |
|---|---|---|---|---|
| Denomination | Number of banknotes to be deposited | Transport destination | Number of stacked banknotes before deposit | Number of stacked banknotes after deposit |
| $1 | 30 | Stacking unit 111 | 50 | 80 |
| $2 | 0 | Reject unit 106 | 1 | 1 |
| $5 | 5 | External stacking unit 122 | 20 | 25 |

TABLE 2-continued

| | Second transaction | | | |
|---|---|---|---|---|
| Denomination | Number of banknotes to be deposited | Transport destination | Number of stacked banknotes before deposit | Number of stacked banknotes after deposit |
| $10 | 10 | External stacking unit 121 | 10 | 20 |
| $20 | 50 | Stacking unit 112 to 115 | 60 | 10 |
| $50 | 5 | Stacking unit 113 | 15 | 20 |
| $100 | 20 | Stacking unit 114 | 10 | 30 |

Since the sixty 20$ banknotes have been already deposited in the first transaction, when the fifty 20$ banknotes are deposited in the second transaction, the number of 20$ banknotes exceeds 100. Hence, forty banknotes out of the fifty banknotes in the second transaction are transported to the stacking unit 112 and the number of banknotes stacked in the stacking unit 112 reaches 100, while the remaining ten banknotes are transported to the stacking unit 115. One hundred 20$ banknotes stacked in the stacking unit 112 are transported to the banknote bundling unit 200 by the transport unit 300, to be bundled.

Figure 3:
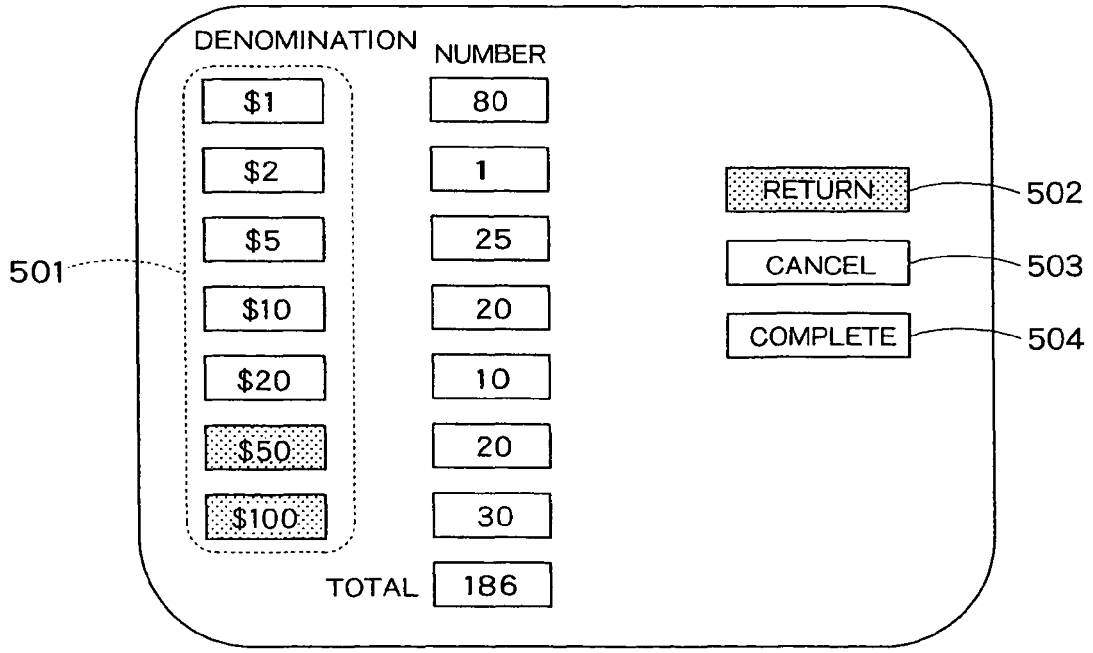
FIG. 3 is a diagram showing one example of a display screen for setting the return of an odd banknote.

After the deposit confirmation, the numbers of stacked banknotes contained inside of the banknote handling machine 10 is displayed on the operation/display unit 11, by denomination, as shown in FIG. 3. Thereafter, the return of the banknotes can be set.

The 50$ banknotes and the 100 $ banknotes are designated by the denomination keys 501 as the banknotes to be returned. Then, by pressing the return key 502, twenty 50$ banknotes stacked on the stacking unit 113 and the thirty 100$ banknotes stacked on the stacking unit 114 are returned through the odd banknote returning unit 130.

Figure 4:
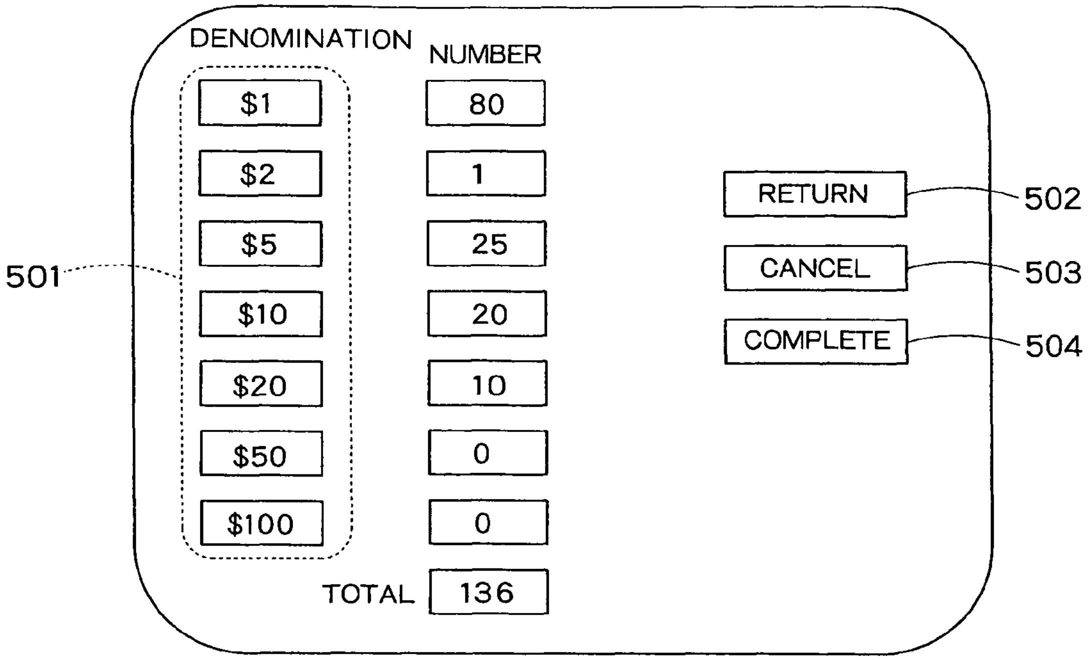
FIG. 4 is a diagram showing one example of a display screen for setting the return of an odd banknote.

The display screen on the operation/display unit 11 after the return of the banknotes is shown in FIG. 4.

As shown in Table 3, fifty 1$ banknotes, five 5$ banknotes, ten 10$ banknotes, fifty 20$ banknotes, ten 50$ banknotes, and five 100$ banknotes are deposited in a third transaction subsequent to the second transaction. The 20$ banknotes are switched to be transported to the stacking unit 115 during the banknote processing in the second transaction, and therefore, they are transported to the stacking unit 115.

TABLE 3

| | Third transaction | | | |
|---|---|---|---|---|
| Denomination | Number of banknotes to be deposited | Transport destination | Number of stacked banknotes before deposit | Number of stacked banknotes after deposit |
| $1 | 50 | Stacking unit 111 to 112 | 80 | 30 |
| $2 | 0 | Reject unit 106 | 1 | 1 |
| $5 | 5 | External stacking unit 122 | 25 | 30 |
| $10 | 10 | External stacking unit 121 | 20 | 30 |

TABLE 3-continued

| | Third transaction | | | |
|---|---|---|---|---|
| Denomination | Number of banknotes to be deposited | Transport destination | Number of stacked banknotes before deposit | Number of stacked banknotes after deposit |
| $20 | 50 | Stacking unit 115 | 10 | 60 |
| $50 | 10 | Stacking unit 113 | 0 | 10 |
| $100 | 5 | Stacking unit 114 | 0 | 5 |

The eighty 1$ banknotes in total have been already stacked in the stacking unit 111 at the timing of the completion of the banknote processing for the second transaction. Therefore, when fifty 1$ banknotes are deposited in the third transaction, the number of 1$ banknotes exceeds 100. Consequently, twenty banknotes out of the fifty banknotes in the third transaction are transported to the stacking unit 111. When the number of banknotes stacked in the stacking unit 111 reaches 100, the remaining thirty banknotes are transported to the open stacking unit 112. One hundred 1$ banknotes stacked in the stacking unit 111 are transported to the banknote bundling unit 200 by the transport unit 300, to be bundled.

Figure 5:
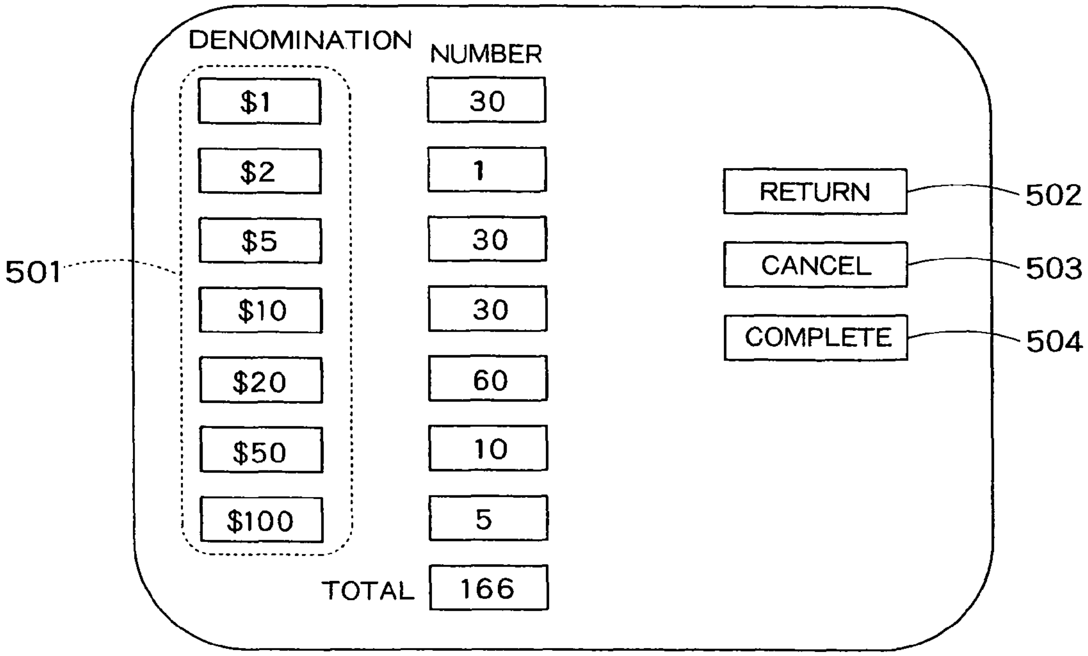
FIG. 5 is a diagram showing one example of a display screen for setting the return of an odd banknote.

After the deposit confirmation, the numbers of stacked banknotes contained inside of the banknote handling machine 10 is displayed on the operation/display unit 11 by denomination, as shown in FIG. 5. Thereafter, the return of the banknotes can be set.

In this manner, in the present embodiment, it can be set by denomination of the banknotes whether the banknote processing for the subsequent transaction is performed while the odd banknotes are left in the stacking units 111 to 115, or they are returned every time a transaction is ended.

The banknotes of the denomination to be processed in the smaller number may be returned to prevent such banknotes from keeping occupying the stacking unit and the stacking units can be efficiently used. In addition, if the odd banknotes are left in the stacking units, banknotes of desired denominations included in the banknote processing for a plurality of transactions can be efficiently bundled.

In this manner, the banknote processing for a plurality of series of transactions can be efficiently performed by the banknote handling machine in the present embodiment.

In the above-described embodiment, not only the denomination and number of banknotes but also where the banknotes of each denomination are stacked may be displayed on a return setting screen for the odd banknotes. Additionally, not the denomination but the stacking unit to which the odd banknotes are returned may be designated.

Second Embodiment

Figure 6:
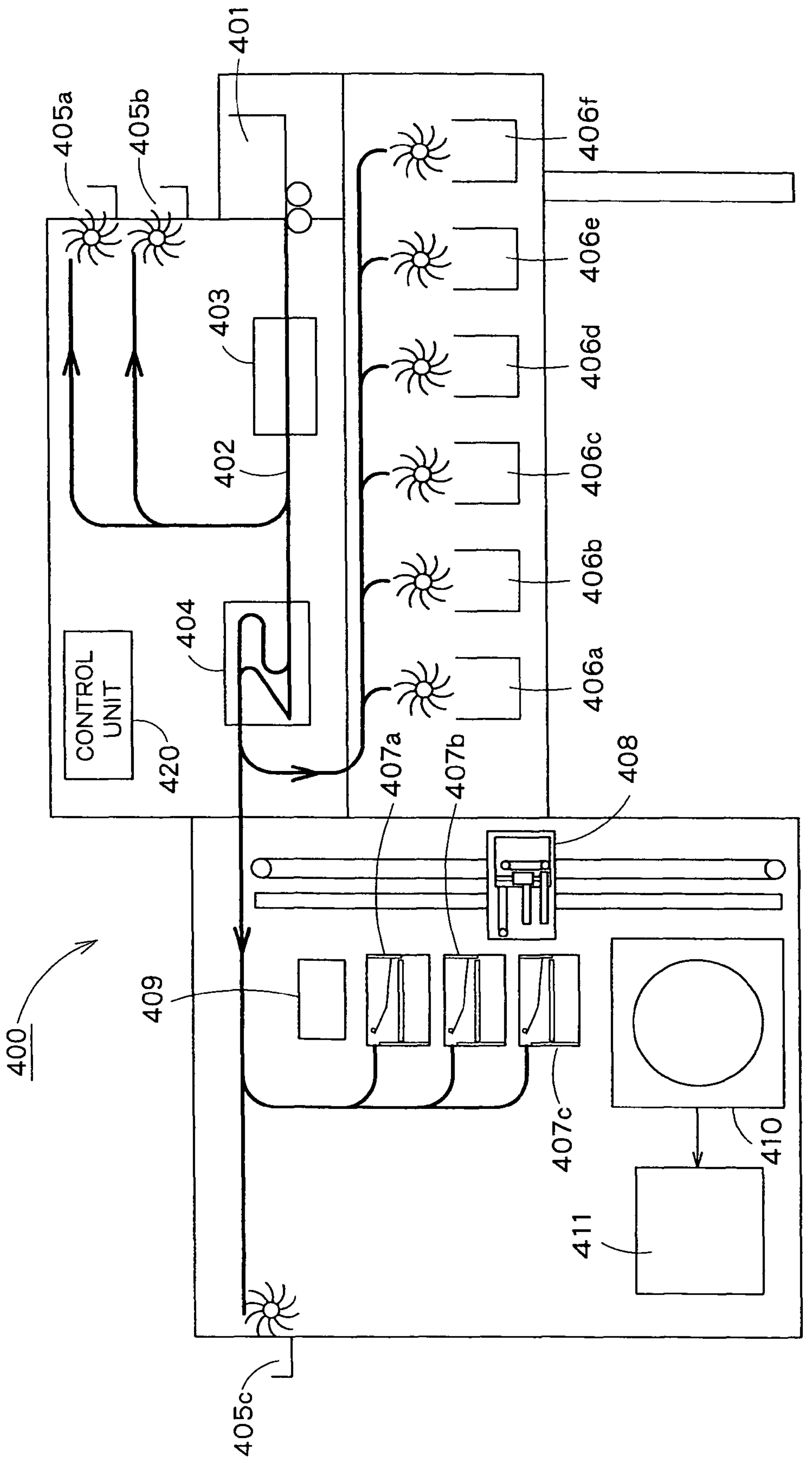
FIG. 6 is a vertically cross-sectional view showing a banknote handling machine in a second embodiment according to the present invention.

FIG. 6 is a vertically cross-sectional view schematically showing the inside configuration of a banknote handling machine in a second embodiment according to the present invention. A banknote handling machine 400 includes a receiving unit 401, a transport unit 402, a recognition unit 403, a reversing mechanism 404, reject units 405*a*, 405*b*, and 405*c*, external stacking units 406*a* to 406*f*, stacking units 407*a* to 407*c*, a batch transport unit 408, an odd banknote returning unit 409, a banknote bundling unit 410, a bundled banknote storing unit 411, and a control unit 420. In addition, the banknote handling machine 400 includes an operation/display unit, not shown.

The receiving unit 401 is adapted to take in banknotes placed by an operator into the inside of a casing of the banknote handling machine 400 one by one.

The transport unit 402 is disposed inside of the casing of the banknote handling machine 400, for transporting the banknotes taken in through the receiving unit 401. The transport unit 402 transports the banknotes according to the control unit 420.

The transport unit 402 is, for example, the combination of belt transport mechanisms including a pair of rollers or three or more rollers and one or more rubber belts, for example, stretched across the rollers.

The recognition unit 403 is disposed on the transport unit 402, for judging the denomination, authentication, fitness, face/back or the like of banknotes transported by the transport unit 402 or counting the banknotes, and further, detecting abnormal transportation such as overlapped banknotes. The recognition unit 403 is adapted to send recognition/count result to the control unit 420.

The transport unit 402 is diverted after passing through the recognition unit 403. Reject banknotes are transported to and stacked in the reject unit 405*a* or 405*b* according to the recognition result obtained by the recognition unit 403. The reject banknotes are transported to the reject unit 405*a* or 405*b* according to reject factors. For example, the reject banknotes that have been abnormally transported are transported to the reject unit 405*a*, while the reject banknotes whose denomination and authentication have been abnormally identified are transported to the reject unit 405*b*.

In the meantime, the face/back of the banknotes other than the reject banknotes are reversed such that the face/back of the banknotes match with each other based on the face/back judgment result obtained by the recognition unit 403. Banknotes not to be bundled out of the banknotes reversed such that the face/back of the banknotes match with each other are stacked in any of the external stacking units 406*a* to 406*f* based on the denomination or the like judged by the recognition unit 403.

The banknotes to be bundled are transported to any of the stacking units 407*a* to 407*c*. A sensor, not shown, for detecting the number of transported banknotes is disposed at a banknote inlet of each of the stacking units 407*a* to 407*c*. This sensor outputs the number of banknotes stacked in each of the stacking units 407*a* to 407*c* to the control unit 420. When the number of banknotes stacked in each of the stacking units 407*a* to 407*c* reaches a predetermined number, the batch transport unit 408 takes out the banknote batch stacked in the stacking unit, and then, transports it to the banknote bundling unit 410.

One of the stacking units 407*a* to 407*c* is designed not to receive the transported banknotes, that is, to be open. While the batch transport unit 408 takes out the banknote batch from the stacking unit, the stacking unit cannot receive any banknote, and therefore, banknotes are transported to and stacked in the open stacking unit.

The banknote batch transported to the banknote bundling unit 410 is bundled, and finally, is stored in the bundled banknote storing unit 411.

In the meantime, the batch transport unit 408 can transport odd banknotes stacked in the stacking units 407*a* to 407*c* to the odd banknote returning unit 409, which is, for example, an open pocket.

The configurations of the stacking units 407*a* to 407*c*, the batch transport unit 408, and the banknote bundling unit 410 are the same as those of the stacking units 111 to 115, the transport unit 300, and the banknote bundling unit 200 in the first embodiment, and therefore, their detailed description will not be repeated.

The control unit 420 controls the transport unit 402 and the batch transport unit 408 according to the recognition result obtained by the recognition unit 403, the number of banknotes stacked in each of the stacking units 407*a* to 407*c*, the return setting of the odd banknotes, or the like.

A description will be given below of one example of operation of the above-described banknote handling machine 400. The banknote taken in through the receiving unit 401 is recognized in the recognition unit 403, and then, the reject banknotes are transported to the reject unit 405*a* or 405*b*.

The banknotes not to be bundled out of the banknotes other than the reject banknotes are transported to any of the external stacking units 406*a* to 406*f* according to the denomination of the banknotes. In contrast, the banknotes to be bundled are transported to any of the stacking units 407*a* to 407*c* by the transport unit 402. Here, any one of the stacking units 407*a* to 407*c* is set as the open stacking unit, to which no banknote is transported.

When the number of banknotes stacked in any one of the stacking units 407*a* to 407*c* reaches a predetermined number (e.g., 100), the banknote batch having the predetermined number of banknotes is transported to the banknote bundling unit 410 by the batch transport unit 408, and then, is bundled. The bundled banknote batch is stored in the bundled banknote storing unit 411.

When all of the banknotes deposited through the receiving unit 401 are taken in and the banknote processing is completed after the deposit confirmation, the return of the odd banknotes stacked in the stacking units 407*a* to 407*c* can be set.

The return setting is the same as that in the first embodiment. An operator can designate the denomination of the banknotes to be returned via the operation/display unit, not shown. The control unit 420 takes out the odd banknotes of the designated denomination from the stacking units 407*a* to 407*c*, and then, controls the batch transport unit 408 such that the odd banknotes are transported to the odd banknote returning unit 409. In this manner, the odd banknote of the desired denomination can be readily removed.

As described above, it is possible to process the banknotes for a subsequent transaction while the odd banknotes stacked in the stacking unit are left by denomination, or to set them in such a manner as to return them each time a transaction is ended in the present embodiment, like in the first embodiment. As a consequence, it is possible to efficiently process the banknotes in a series of transactions.

In the first and second embodiments, the denomination of the odd banknote to be returned may be designated in each transaction. Alternatively, the denomination to be returned or to be left may have been previously set, and then, initialization may be performed such that the banknotes of the set denomination are automatically returned after the completion of the transaction. Or, the denomination of banknotes to be processed in a smaller number (i.e., the predetermined number or less) may be automatically set as the denomination of the odd banknotes to be returned by the machine based on the recognition result in the banknote processing of a plurality of transactions.

The various types of the odd banknotes to be returned can include, for example, the kind of currency, denomination, new/old version, series, and the kind of banknotes distinguished by an issuing bank.

Moreover, in the first and second embodiments, the operation/display unit (i.e., the designation receiving unit) may include a mode designating unit for designating a continuous processing mode in which the banknote processing is sequentially performed for a plurality of transactions. Upon completion of the banknote processing for one transaction, the odd banknotes stacked on the stacking units 111 to 115 and 407*a* to 407*c* are not returned but all of them are left in the continuous processing mode, and then, the banknote processing for a subsequent transaction is started. The control units 12 and 420 control the transport unit 300 and the batch transport unit 408 such that all of the odd banknotes are kept in the stacking units 111 to 115 and 407*a* to 407*c* when the continuous processing mode is designated.

The present invention is not limited to the above embodiment as it is, and the invention can be embodied with its constituent elements modified in an implementation phase without departing from the scope of the invention. Further, various inventions can be formed by appropriate combinations of a plurality of constituent elements disclosed in the above embodiment. For example, some constituent elements may be deleted from all the constituent elements shown in the embodiment. Furthermore, the constituent elements over different embodiments may be appropriately combined.

What is claimed is:

1. A banknote handling machine comprising:

a receiving unit, through which deposited banknotes are taken in one by one;

a recognition unit which recognizes and counts the banknotes taken in through the receiving unit;

a plurality of stacking units which stack therein the banknotes recognized by the recognition unit, by type of each banknote;

a transport unit which transports the banknotes from the receiving unit to the stacking unit;

a bundling unit which bundles a predetermined number of banknotes stacked in the stacking units; and a control unit which returns odd banknotes of a first predetermined type every time a transaction is ended, and performs a banknote processing for a subsequent transaction while leaving odd banknotes of a second predetermined type in the stacking unit, wherein the first predetermined type and the second predetermined type are the kinds of banknotes or denominations, respectively.

2. The banknote handling machine according to claim 1, further comprising an instruction receiving unit which receives an instruction on the first predetermined type or the second predetermined type.

3. The banknote handling machine according to claim 2, wherein the instruction receiving unit serves as a mode designating unit for designating a continuous processing mode in which processing is sequentially performed for a plurality of transactions.

4. The banknote handling machine according to claim 1, wherein the control unit automatically sets the first predetermined type or the second predetermined type based on the number of banknotes by type recognized and counted by the recognition unit.

5. The banknote handling machine according to claim 4, wherein the control unit sets the banknotes whose number recognized and counted by the recognition unit is a predetermined number or less as the odd banknotes of the first predetermined type.

* * * * *